(12) United States Patent
Velusamy

(10) Patent No.: US 8,953,774 B2
(45) Date of Patent: *Feb. 10, 2015

(54) APPARATUSES, METHODS AND SYSTEMS FOR ACCESSING A NEW CUSTOMER SERVICE REPRESENTATIVE AND FOR MONITORING CUSTOMER SERVICE

(71) Applicant: Verizon Patent and Licensing Inc., Basking Ridge, NJ (US)

(72) Inventor: Umashankar Velusamy, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 164 days.

This patent is subject to a terminal disclaimer.

(21) Appl. No.: 13/769,143

(22) Filed: Feb. 15, 2013

(65) Prior Publication Data

US 2013/0163744 A1    Jun. 27, 2013

Related U.S. Application Data

(63) Continuation of application No. 12/347,913, filed on Dec. 31, 2008, now Pat. No. 8,379,831.

(51) Int. Cl.
*H04M 3/00* (2006.01)
*H04M 3/51* (2006.01)
*H04M 7/00* (2006.01)

(52) U.S. Cl.
CPC .............. *H04M 3/5175* (2013.01); *H04M 3/51* (2013.01); *H04M 7/003* (2013.01); *H04M 7/0042* (2013.01); *H04M 2203/401* (2013.01)

USPC .................................................... 379/265.06

(58) Field of Classification Search
USPC .......................... 379/265.06, 265.11, 265.13
See application file for complete search history.

(56) References Cited

U.S. PATENT DOCUMENTS

| | | | |
|---|---|---|---|
| 5,617,471 | A | 4/1997 | Rogers et al. |
| 7,366,293 | B2 | 4/2008 | Ezerzer et al. |
| 2003/0120526 | A1 | 6/2003 | Altman et al. |
| 2007/0160054 | A1 | 7/2007 | Shaffer et al. |

OTHER PUBLICATIONS

Entire Prosecution of U.S. Appl. No. 12/347,913 to Umashankar Velusamy entitled "Apparatuses, Methods and Systems for Accessing a New Customer Service Representative and for Monitoring Customer Service".

*Primary Examiner* — Oleg Asanbayev

(57) ABSTRACT

This disclosure details the implementation of methods, systems and computer program products for a customer satisfaction engine (CSE). Embodiments of the CSE allow callers to key in customer satisfaction data using a rating system and/or to change customer service representatives (CSR) during the course of a customer service call rather than after the call has ended. Caller generated ratings may be stored in a database in association with the respective CSR profile for later access, analysis, and/or review. CSE embodiments may also allow customers to log in to a website and view operations made by the CSR as a service call progresses. CSE systems may provide for improved customer service and allow companies improved efficiency, monitoring and reporting of CSR performance.

26 Claims, 6 Drawing Sheets

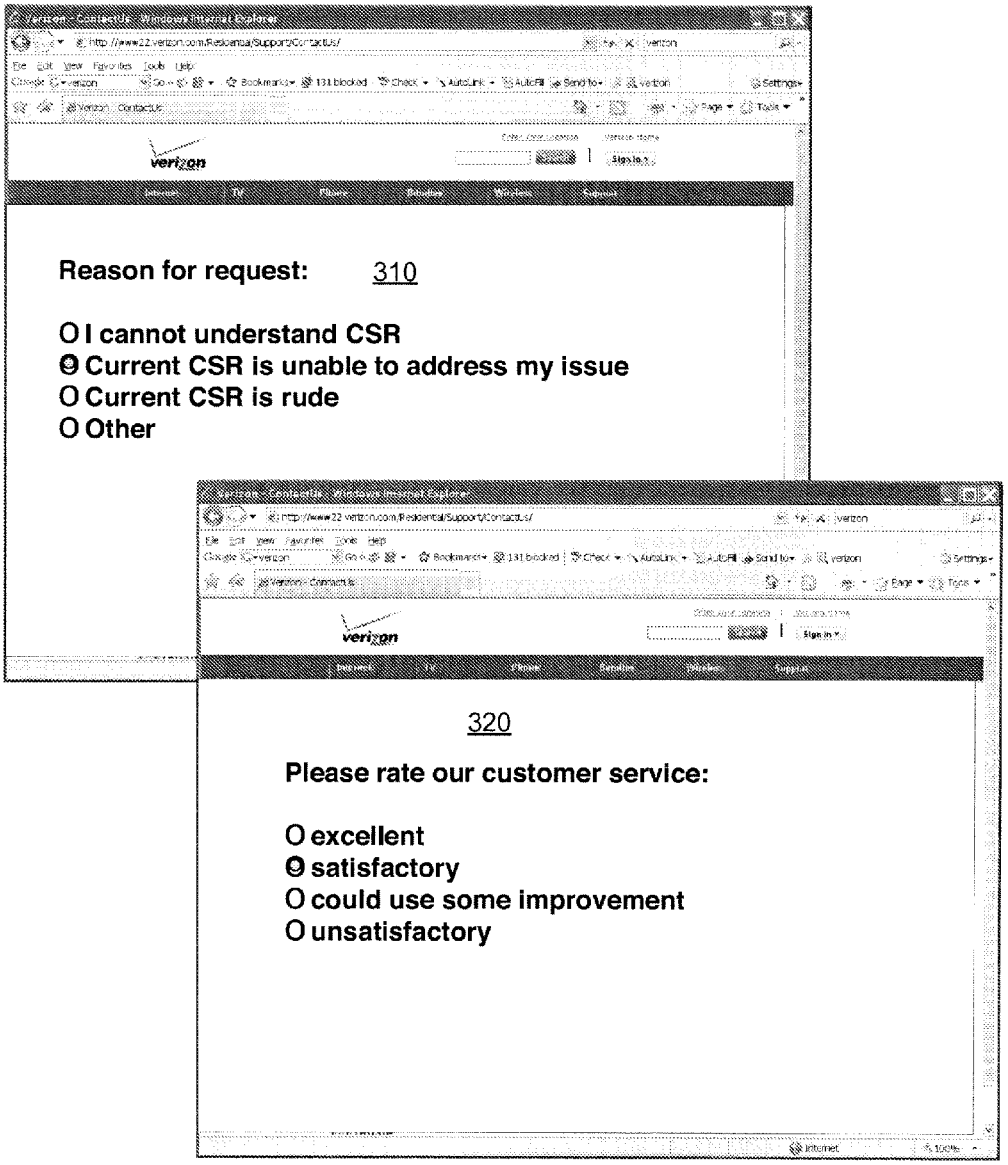

APPARATUSES, METHODS AND SYSTEMS FOR ACCESSING A NEW CUSTOMER SERVICE REPRESENTATIVE AND FOR MONITORING CUSTOMER SERVICE

CROSS REFERENCE TO RELATED APPLICATION

This application is a continuation of and claims priority to U.S. application Ser. No. 12/347,913, filed on Dec. 31, 2008 now U.S. Pat. No. 8,379,831, the entire contents of which are incorporated herein by reference.

BACKGROUND

Companies have customer service departments which employ customer service representatives (CSR) to provide support to customers. Typically, customers call a toll-free number to receive service and advice. Companies generally monitor the performance of their CSRs through customer satisfaction surveys. Following a call to a CSR, often a customer will be asked to take a customer satisfaction survey. However, a customer may opt not to take the survey depending on his own preference for taking surveys or the amount of time required.

BRIEF DESCRIPTION OF THE DRAWINGS

FIGS. 3A-3B show aspects of an implementation of a service web page interface for switching and/or rating the service provided by the CSRs in one embodiment CSE operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for a Customer Satisfaction Engine (hereinafter, "CSE"). Customers making service calls may find their experience with the CSR unsatisfactory and/or inefficient for a number of reasons. For example, the customer may be subject to long wait times and/or numerous transfers, the customer may have to call back a number of times especially if the CSR lacks expertise to understand the customer's specific problem or the CSR may be rude. A customer's dissatisfaction reflects negatively on the company that the CSR represents and may result in a customer terminating the service. As for customer satisfaction surveys, customers who opt out of taking surveys, or surveys that are given after a long lag time, may deprive companies of valuable customer feedback.

The CSE allows customers the freedom to promptly change to a new customer service representative (CSR) if they are unsatisfied with the customer service they are receiving. Embodiments will allow customers to press a key on the phone or, if logged on to the customer service website, click on a link to change representatives. Further, some implementations will allow customers to monitor the progress of the call in real time on the website. Aspects of the invention will also allow customer satisfaction surveys to be integrated inconspicuously during the call itself rather than after the customer has hung up. The instant disclosure discusses embodiments of the CSE within the context of customer service. However, it is to be understood that the system described herein may be readily configured for a wide range of other applications or implementations. For example, aspects of the CSE can be configured to a wide variety of survey types and applications in which ratings or satisfaction data are used.

Figure 1:
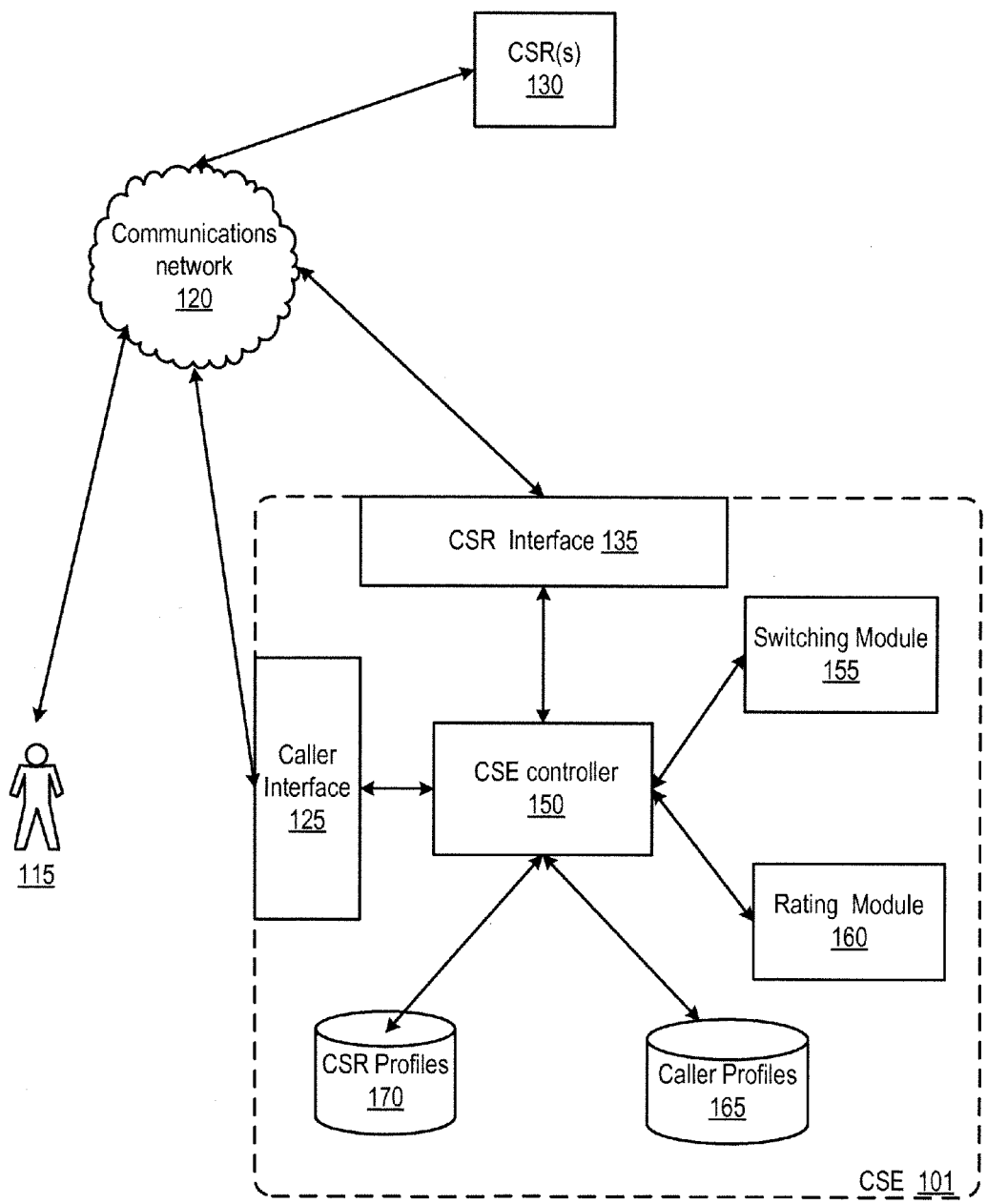
FIG. 1 provides an overview of an implementation of the Customer Satisfaction Engine (CSE) components and affiliated entities in one embodiment of the Customer Satisfaction Engine operation.

FIG. 1 provides an overview of an implementation of CSE components and affiliated entities in one embodiment of CSE operation. The CSE 101 may contain a number of computational modules and/or data stores. A CSE controller 150, may serve a central role in some embodiments of CSE operation, serving to orchestrate the reception, generation, and distribution of data and/or instructions to, from and between CSE modules and/or allow further analysis of data generated during CSE operation. A caller 115, who may be equipped with a communication device such as a telephone or wireless telephone and, in one implementation, a computing terminal, may access call center services, a CSR, CSE features, and/or the like via a communications network 120 coupled to a CSE caller interface, 125. The caller interface 125 may be configured to provide interactive voice recognition operation (IVR) which, in one implementation, may present options for the caller to indicate satisfaction or dissatisfaction and/or allow a caller to request a new CSR. In some implementations, the caller interface 125 may be further configured to receive, relay, and/or process caller inputs, such as tones, digital signals, and/or the like associated with buttons pressed on a user's telephone device; caller voice inputs, which may be converted to digital signals via application of voice recognition systems; and/or the like. In one implementation, the caller interface 125 may further serve to generate and/or provide a web interface for caller interactions with information pertaining to a caller's service account, a call in progress, past calls, and/or the like.

A CSR center 130, comprising a plurality of CSRs, may also communicate via a communications network 120 with the CSE 101 by means of a CSR interface 135. The CSR interface 135 may receive, relay, and/or process CSR actions and/or activities for use, analysis, and/or the like by CSE components and/or affiliated entities. For example, in one implementation, the CSE may monitor CSR actions pertaining to a caller's service account (e.g., registering a payment, submitting an inquiry to another department, etc.) and relay that information for display to the caller via a web interface. Raw and/or processed caller inputs, such as ratings, requests for new CSRs, and/or the like may also be relayed to a CSR center 130 via the CSR interface 135. In one implementation, the CSE 101 may be incorporated within a CSR center 130 and/or integrated with CSR systems.

The CSE controller 150 may be coupled to one or more operational modules configured to implement various features associated with embodiments of CSE operation. In one implementation, the CSE controller 150 may be coupled to a rating module 160 configured to receive and process caller inputs pertaining to ratings and/or other evaluations of CSRs, call experiences, and/or the like. For example, in one implementation, when a caller presses a specific key one or more times the rating module may process a number of presses and/or translates such presses into a satisfaction rating. At the end of a call, but prior to hanging up, the CSE may prompt the caller to enter additional satisfaction data. Satisfaction data may then be processed to update a CSR profile stored in a CSR profiles database 170. In various implementations, satisfaction data may be stored in association with a particular CSR, user, call, time/date, CSR center manager, CSR center policy, and/or the like.

In one implementation, the CSE controller 150 may further be coupled to a switching module 155, configured to effect transfer of a call from one CSR to another based on inputs received from a caller and/or to receive and/or assess caller reasons for requesting a new CSR. In one implementation, a caller may press a predetermined key indicating that a new CSR is requested. The CSR controller may then cause the call with the first CSR to be ended and direct the call to a new CSR. Prior to speaking to the new CSR, an interactive voice response system (IVR) may present an option to indicate satisfaction or dissatisfaction in addition to instructions for the caller to indicate his or her reason for requesting a new CSR. Depending on the options the customer chooses, the call may be transferred to another representative through the communications network 120, who may be the next available CSR or a CSR who is trained to handle specific scenarios.

In one implementation, when a call is transferred, information gathered by the first CSR, along with any activities performed, may be transferred to the second CSR along with the call. After speaking to the second CSR, satisfaction ratings for the first and second CSR may be tallied and stored in association with the respective CSRs in a CSR profile database 170.

In one embodiment, a caller may be logged into a customer service website, such as via the caller interface 125, that is configured to monitor the progress of the call in real time. For example, the customer requesting support may type a customer identifier, login, password, and/or the like on the website and view the progress of their call. Further, the CSE system may be linked to the operations being performed by the customer allowing the customer to provide feedback by watching the call as it progresses. The customer may also key in satisfaction ratings at various times during the call. A caller profile may also be stored, such as in a caller profiles database 165, allowing more efficient communication should the customer call for information at a later time.

In one implementation, companies, CSR centers, and/or other CSE affiliated agencies may impose an incubation period before a caller is allowed to select a new CSR. For example, a caller may be required to talk to a particular CSR for at least 3 minutes before being provided with the opportunity to switch to another CSR by pressing a button on his or her telephone or clicking a link on a CSE web interface. In one implementation, an indicator may be provided to the caller to signal that he or she may now switch CSRs if desired (e.g., a tone, a message, and/or the like). The number of times a customer may transfer to a new CSR may also be limited in some implementations. For example, in one implementation, a company operating a CSR service may choose to limit the transfer option to a maximum of 3 times. An attempt to transfer more than 3 times may be taken as an indication of a problem with the customer, with the expertise of the CSRs involved, and/or the like, and a record may be stored in association with a customer profile, CSR profile, and/or the like indicating the problem. In either case, the call may be transferred to a supervisor and/or the caller may be presented with additional choices.

In a further implementation, a company, CSR center administrator, CSE administrator, and/or the like may be provided access to CSR profiles and/or the CSR profiles database 170, such as to monitor ongoing customer service through a point system and/or be used to generate CSR reports. Thus, the system may establish a tracking mechanism to assess CSR performance. Furthermore, the information may be shared among CSRs, supervisors, administrators, management, and/or the like providing a mechanism and incentive to individually and collectively improve the performance of the CSRs. In one implementation, CSR ratings may be stored in association with particular times and/or dates at which the ratings were registered and/or in association with particular call service policies that were implemented during the calls in which the ratings were registered. In this manner, a CSR and/or CSE administrator, manager, supervisor, and/or the like may discern the impact of a particular call service policy, method, technique, and/or the like on customer satisfaction levels.

Figure 2A:
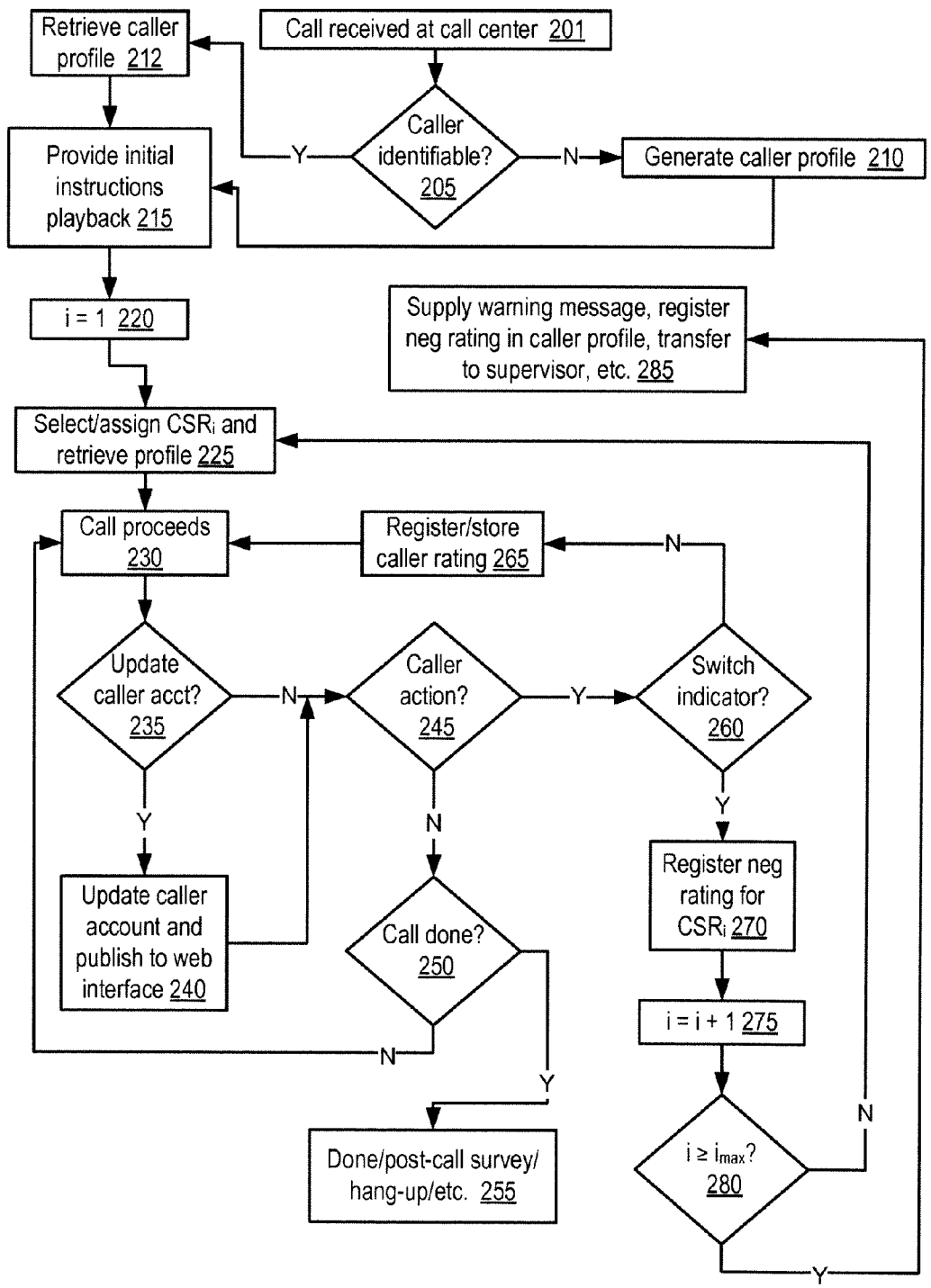
FIG. 2A shows an implementation of logic flow for service call handling in one embodiment of CSE operation.

FIG. 2A shows an implementation of logic flow for service call handling in one embodiment of CSE operation. A call may be received at a call center at 201. A determination may be made as to whether the caller is identifiable 205, such as based on the number from which the caller is calling. In one implementation, a caller is only deemed identifiable if a caller profile already exists for the caller. If no caller profile exists, the CSE may generate a new caller profile 210 for storage in a caller profile database. If the caller is identifiable at 205, then the CSE may retrieve a caller profile, such as based on a caller identifier (e.g., a caller telephone number). The CSE system may provide initial instructions for play back to the caller, such as via a pre-recorded message played soon after a call is received at the CSR center, on how the customer may indicate the level of satisfaction and/or transfer to a new representative. In one implementation, a caller may be directed to indicate level of satisfaction by pressing the "*" key 1 to 5 times with "*" indicating very dissatisfied and "*****" indicating very satisfied; if the caller would like to speak to another CSR during the call he/she will be directed to "press #". In another implementation, pressing a key such as "*" may only be used to represent satisfaction, and the caller may be permitted to register satisfaction a large or unlimited number of times. In one implementation, a dissatisfaction and/or negative rating may be registered for a CSR when a caller indicates a desire to change CSRs. In one implementation, a negative indicator, warning, and/or the like may be associated with a caller profile for a caller who attempts to register CSR transfers beyond a set limit or otherwise registers ratings and/or transfers outside a set of rules set for an implementation of the CSE system.

After the instructions are given, an indexing variable i may be initialized to 1 220, and a first CSR may be selected and/or assigned to the call, such as by selecting the CSR from a list of available CSRs 225. In one implementation, selection of a CSR may be based on the type of call that is received (e.g., the caller may be asked to specify a problem before CSR selection), CSR expertise, and/or the like. The call with the first CSR proceeds 230, and a determination may be made as to whether any updates have been implemented with respect to the caller's service account, profile, and/or the like 235. In the course of the conversation between the caller and the CSR, a wide variety of changes may be implemented to a caller's record to indicate such as, for example, removal of a mistaken charge, correction of an error, registration, updates, and/or the like. If an update is implemented, then the caller's account and/or profile may be updated, and updates may be published to a web interface for viewing by the caller 240, thereby allowing the caller to monitor in real time the progress and/or tangible consequences of the call.

A determination may then be made as to whether any from a pre-determined set of caller actions have taken place 245, such as, but not limited to, pressing one or more keys on a caller's telephone, clicking a link on a web interface, and/or the like. If no action has taken place, a determination may be made as to whether the call is complete (e.g., that a CSR has indicated completion) 250. If so, then the CSE may end the call, implement a post-call survey, hang up, and/or the like 255. Otherwise, the call may proceed 230. If, at 245, a caller action is recognized, then a determination may be made as to whether the caller action comprises a switch indicator 260 (i.e., an indication that the caller wishes to change to a different CSR). In one implementation, a caller may be required to stay on with a particular CSR for a set period of time before being permitted to submit a switch indicator. If the caller action is not a switch indicator, then the caller has submitted a rating indicator, and the rating is registered and/or stored in association with a CSR, caller, and/or the like in a CSR profile, caller profile, and/or the like 265. Ratings may be registered by a wide variety of different methods in different implementations, such as, but not limited to, pressing a particular button or sequence of buttons on a telephone device, clicking a link or entering a comment or numerical value via a web interface, and/or the like. In one implementation, components of the PBX Asterisk platform may be employed for interpreting inputs. In some implementations, recognizing caller actions may take place at any time after the caller talks to the CSR and/or at any time after expiration of an incubation period.

In some implementations, the CSE may admit various methods of assigning points and/or otherwise registering ratings for consecutive CSRs. For example, if a second CSR resolves an issue that a first CSR could not resolve, the second CSR may be awarded additional positive ratings, such as points lost by the first CSR.

In some implementations, the CSE may provide access to CSR ratings in real time and/or for various reporting and/or monitoring purposes. For example, in one implementation, a CSR center administrator, manager, and/or the like may be provided with CSR rating information at a monitoring terminal to permit real-time viewing of CSR ratings for service calls in progress. In another implementation, a CSR representative may aggregate rating information from CSR profiles to yield a rating report that may have ratings organized in a variety of different ways, such as by CSR identifier, time, date, call service policy, caller, department, and/or the like.

If the determination at 260 indicates that a switch indicator has been submitted, then the CSE may register and/or store a record of the switch indicator in association with the CSR's profile 270. In one implementation, the CSR may also receive a negative rating as a result of the switch indicator. In one implementation, a caller may be provided with an interface screen to provide a reason for switching to a new CSR. A caller-provided reason may then be stored in association with the caller, CSR, and/or their respective profiles and later provided for display, aggregation, and/or analysis by a supervisor or CSE system component. The indexing variable i may be incremented 275, and a determination made as to whether the index exceeds a maximum threshold value for the number of times that a caller is allowed to switch CSRs 280. If the index has not equaled or exceeded the maximum, then a new CSR is selected and/or assigned at 225. Otherwise, a warning message may be supplied to the caller that he or she has met or exceeded the maximum number of call transfers, a negative rating and/or other transfer excess indicator may be recorded in association with the caller and/or in a caller profile, the call may be transferred to a supervisor/administrator, and/or the like.

Figure 2B:
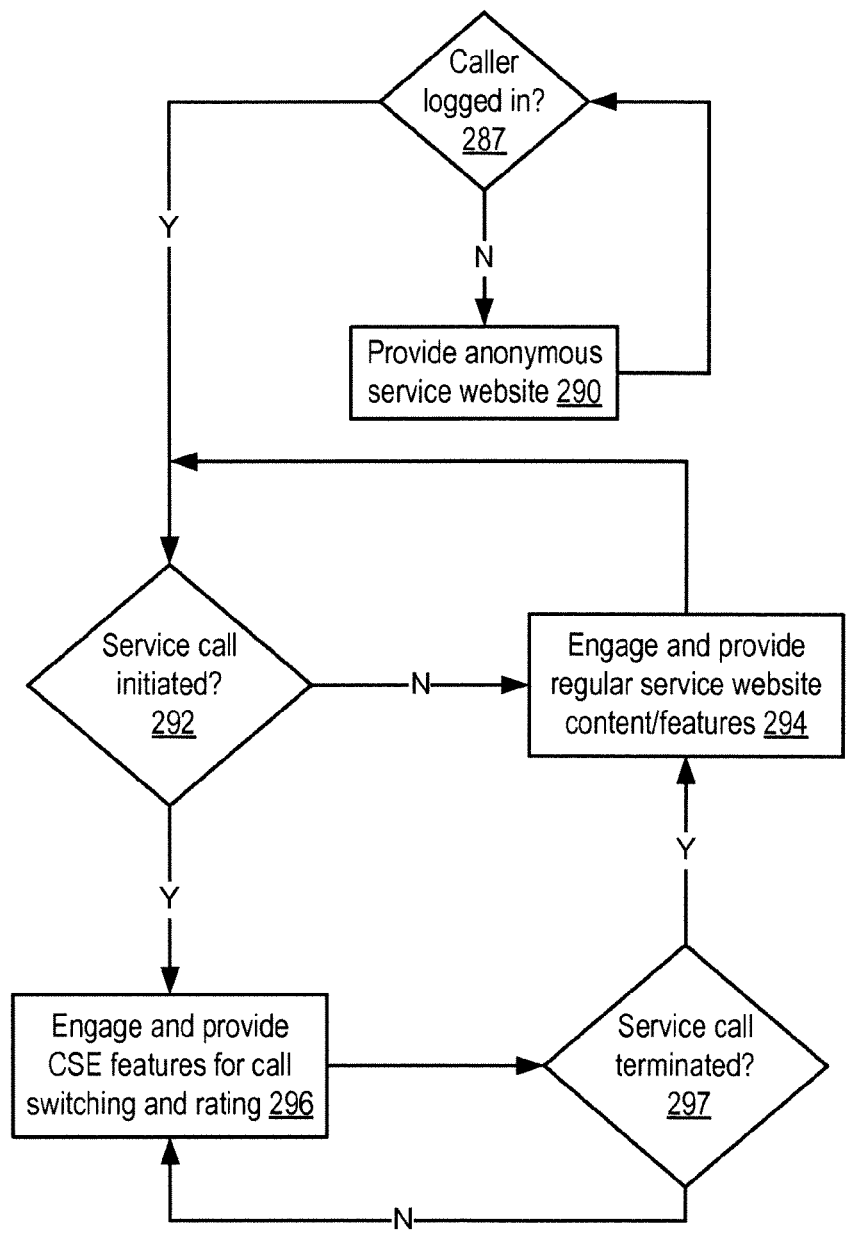
FIG. 2B shows an implementation of logic flow for web interface provision in one embodiment of CSE operation.

FIG. 2B shows an implementation of logic flow for web interface provision in one embodiment of CSE operation. The CSE may determine at 287 as to whether the caller is logged in at a CSE web site. If not, then an anonymous version of the CSE website may be provided for the caller 290, such as may include limited services and no access to a caller account, profile, and/or the like. When the caller has logged in, a determination may be made as to whether the caller is presently engaged in a service call 292. For example, engagement in a service call may cause an indicator to be sent from a CSR center to a CSE system implementing a web interface. If the caller is not engaged in a service call, then a regular service website may be engaged and/or provided for display to the caller 294. The regular service website may, in one implementation, provide personal caller information but may not include CSE features configured for service call interactions. If the caller is engaged in a service call 292, then a web interface for CSE features implementing call switching, CSR rating, and/or the like may be engaged and provided 296.

Figure 3A:
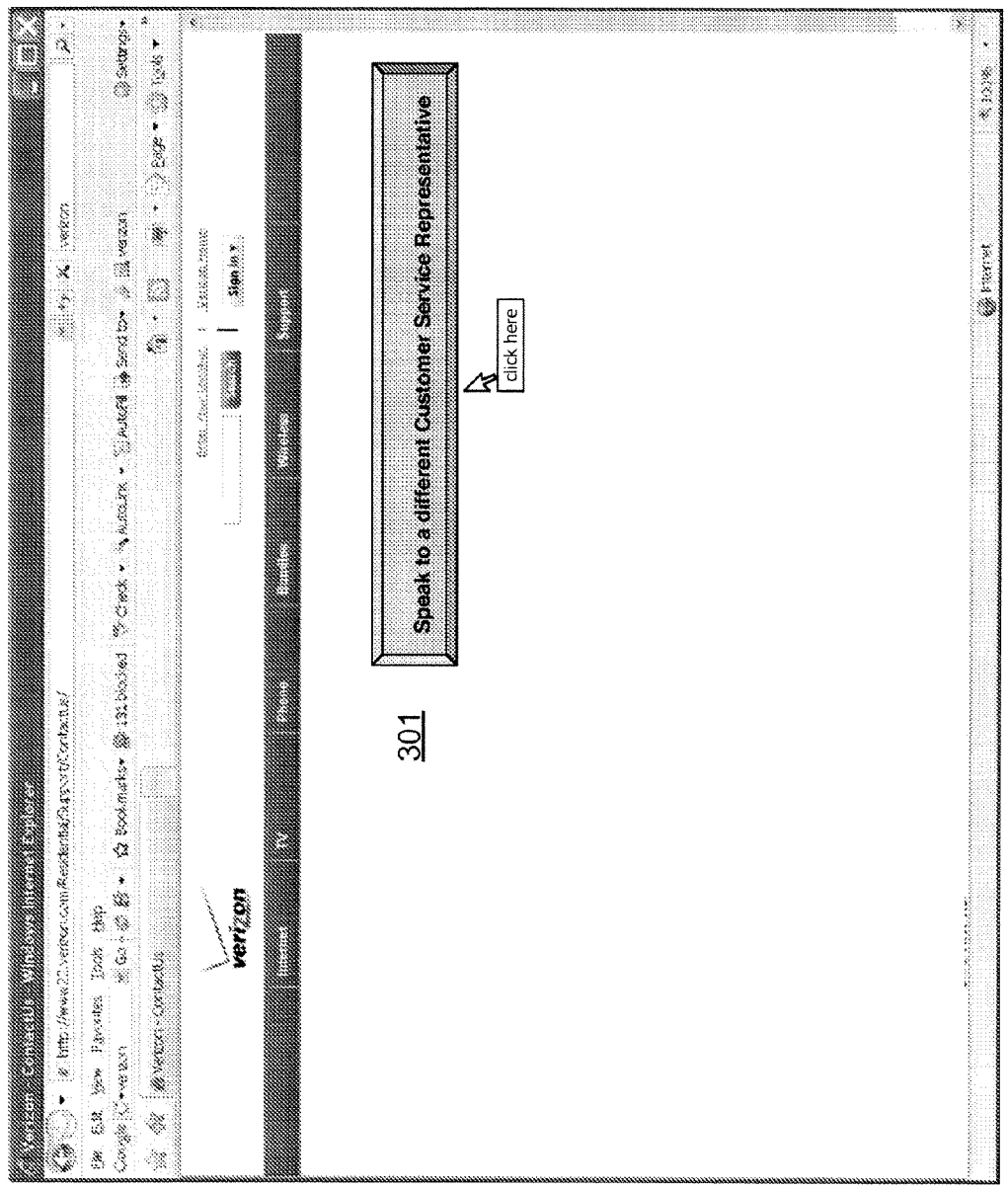

FIGS. 3A-3B show aspects of an implementation of a service web page interface for switching and/or rating CSRs in one embodiment CSE operation. FIG. 3A illustrates elements of a customer service website presented to a caller engaged in a service call. The page includes an interface element 301 configured to receive a switching indicator from the caller (e.g., by clicking on the element, a caller may cause a switching indicator to be registered at the CSE, effectuating a transfer to a new CSR). FIG. 3B shows an implementation of the CSE wherein the customer may be requested to provide a reason for switching CSRs, and may be provided with a selectable set of reasons from which to choose 310. A page 320 is also shown that allows a caller to provide a rating for a CSR, a call experience, a segment of a call, and/or the like. The illustrated implementation shows a selectable set of ratings, however other implementations may admit other types and/or methods of ratings, such as numerical values, thumbs up/down, and/or the like. In one implementation, non-numerical ratings such as those shown at 320 may be converted into numerical ratings prior to storage in association with the CSR.

CSE Controller

Figure 4:
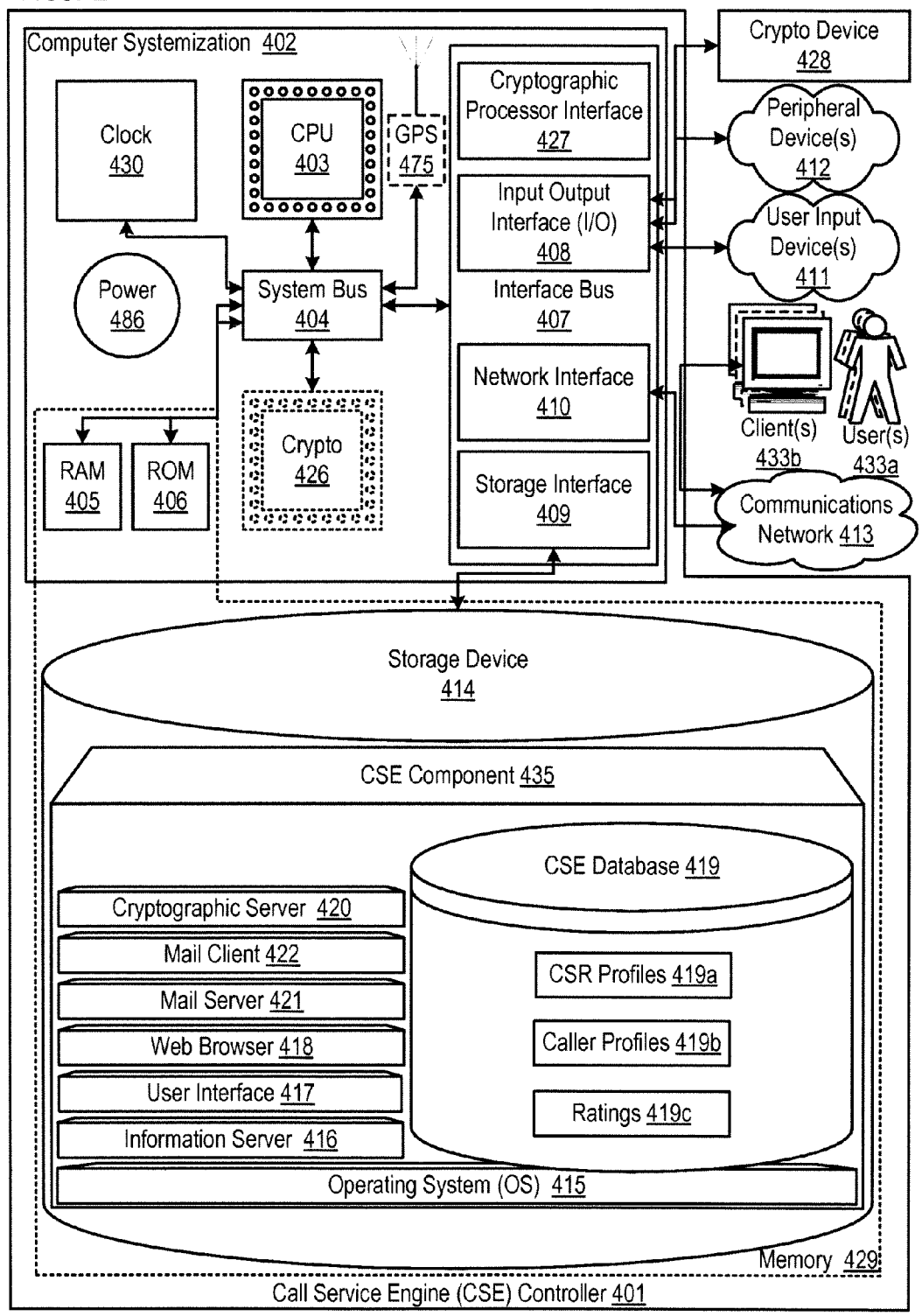
FIG. 4 is of a block diagram illustrating exemplary embodiments of a Manager controller.

FIG. 4 of the present disclosure illustrates inventive aspects of a CSE controller 401 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the CSE controller 401 may be connected to and/or communicate with entities such as, but not limited to: one or more users from user input devices 411; peripheral devices 412; a cryptographic processor device 428; and/or a communications network 413.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CSE controller 401 may be based on common computer systems that may comprise, but are not limited to, components such as: a computer systemization 402 connected to memory 429.

Computer Systemization

A computer systemization 402 may comprise a clock 430, central processing unit (CPU) 403, a read only memory (ROM) 406, a random access memory (RAM) 405, and/or an interface bus 407, and most frequently, although not necessarily, the foregoing are interconnected and/or communicating through a system bus 404. Optionally, the computer systemization may be connected to an internal power source 486. Optionally, a cryptographic processor 426 and/or a global positioning system (GPS) component 475 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the CSE controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 486 is connected to at least one of the interconnected subsequent components of the CSE thereby providing an electric current to subsequent components. In one example, the power source 486 is connected to the system bus component 404. In an alternative embodiment, an outside power source 486 is provided through a connection across the I/O 408 interface. For example, a USB and/or IEEE 1394 connection carries both data and power across the connection and is therefore a suitable source of power.

Interface Adapters

Interface bus(es) 407 may accept, connect, and/or communicate to a number of interface adapters, conventionally although not necessarily in the form of adapter cards, such as, but not limited to: input output interfaces (I/O) 408, storage interfaces 409, network interfaces 410, and/or the like. Optionally, cryptographic processor interfaces 427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 409 may accept, communicate, and/or connect to a number of storage devices such as, but not limited to: storage devices 414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 410 may accept, communicate, and/or connect to a communications network 413. Through a communications network 413, the CSE controller is accessible through remote clients 433b (e.g., computers with web browsers) by users 433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 413. For example, multiple network interfaces may be employed to allow for the communication over broadcast, multicast, and/or unicast networks.

Input Output interfaces (I/O) 408 may accept, communicate, and/or connect to user input devices 411, peripheral devices 412, cryptographic processor devices 428, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 411 may be card readers, dongles, finger print readers, gloves, graphics tablets, joysticks, keyboards, mouse (mice), remote controls, retina readers, trackballs, trackpads, and/or the like.

Peripheral devices 412 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the CSE controller may be embodied as an embedded, dedicated, and/or monitor-less (i.e., headless) device, wherein access would be provided over a network interface connection.

Cryptographic units such as, but not limited to, microcontrollers, processors 426, interfaces 427, and/or devices 428 may be attached, and/or communicate with the CSE controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 429. However, memory is a fungible technology and resource; thus, any number of memory embodiments may be employed in lieu of or in concert with one another. It is to be understood that the CSE controller and/or a computer systemization may employ various forms of memory 429. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 429 will include ROM 406, RAM 405, and a storage device 414. A storage device 414 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 429 may contain a collection of program and/or database components and/or data such as, but not limited to: operating system component(s) 415 (operating system); information server component(s) 416 (information server); user interface component(s) 417 (user interface); Web browser component(s) 418 (Web browser); database(s) 419; mail server component(s) 421; mail client component(s) 422; cryptographic server component(s) 420 (cryptographic server); the CSE component(s) 435; and/or the like (i.e., collectively a component collection). These components may be stored and accessed from the storage devices and/or from storage devices accessible through an interface bus. Although non-conventional program components such as those in the component collection, typically, are stored in a local storage device 414, they may also be loaded and/or stored in memory such as: peripheral devices, RAM, remote storage facilities through a communications network, ROM, various forms of memory, and/or the like.

Operating System

The operating system component 415 is an executable program component facilitating the operation of the CSE controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CSE controller to communicate with other entities through a communications network 413. Various communication protocols may be used by the CSE controller as a subcarrier transport mechanism for interaction, such as, but not limited to: multicast, TCP/IP, UDP, unicast, and/or the like.

Information Server

An information server component 416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CSE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CSE database 419, operating systems, other program components, user interfaces, Web browsers, and/or the like.

Access to the CSE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CSE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CSE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the CSE enabled nodes. The combined application may be nugatory on systems employing standard Web browsers.

Mail Server

A mail server component 421 is a stored program component that is executed by a CPU 403. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CSE.

Access to the CSE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 422 is a stored program component that is executed by a CPU 403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 420 is a stored program component that is executed by a CPU 403, cryptographic processor 426, cryptographic processor interface 427, cryptographic processor device 428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CSE may encrypt incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CSE component to engage in secure transactions if so desired. The cryptographic component facilitates the secure accessing of resources on the CSE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CSE Database

The CSE database component 419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CSE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the CSE database is implemented as a data-structure, the use of the CSE database 419 may be integrated into another component such as the CSE component 435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 419 includes several tables 419a-c. A CSR Profiles table 419a may include fields such as, but not limited to: CSR_ID, CSR_name, contact_info, rating_ID(s), rating_value(s), switching_history, expertise, hours, CSR_center, supervisor, and/or the like. A Caller Profiles table 419b may include fields such as, but not limited to: caller_ID, login, password, caller_name, contact_info, telephone_number, hardware_ID, mobile_device_type, service_account, ratings, switching_history, CSR_ID(s), warnings, call_history, and/or the like. A Ratings table 419b may include fields such as, but not limited to: rating_ID, rating_type, rating_values, usage_rules, and/or the like. These tables may support and/or track multiple entity accounts on the CSE controller.

In one embodiment, the CSE database may interact with other database systems. For example, employing a distributed database system, queries and data access by search CSE component may treat the combination of the CSE database, an integrated data security layer database as a single database entity.

In one embodiment, user programs may contain various user interface primitives, which may serve to update the CSE. Also, various accounts may require custom database tables depending upon the environments and the types of clients the CSE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 419a-c. The CSE may be configured to keep track of various settings, inputs, and parameters via database controllers.

The CSE database may communicate to and/or with other components in a component collection, including itself, and/or facilities of the like. Most frequently, the CSE database communicates with the CSE component, other program components, and/or the like. The database may contain, retain, and provide information regarding other nodes and data.

The CSE Component

The CSE component 435 is a stored program component that is executed by a CPU. In one embodiment, the CSE component incorporates any and/or all combinations of the aspects of the CSE that was discussed in the previous figures. As such, the CSE affects accessing, obtaining and the provision of information, services, transactions, and/or the like across various communications networks.

The CSE component is configurable to access, calculate, engage, exchange, generate, identify, instruct, match, process, search, serve, store, and/or facilitate service call handling, customer service representative switching and rating, customer service representative and caller profile management, and/or the like and use of the CSE.

The CSE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the CSE server employs a cryptographic server to encrypt and decrypt communications. The CSE component may communicate to and/or with other components in a component collection, including itself, and/or facilities of the like. Most frequently, the CSE component communicates with the CSE database, operating systems, other program components, and/or the like. The CSE may contain, communicate, generate, obtain, and/or provide program component, system, user, and/or data communications, requests, and/or responses.

Distributed CSEs

The structure and/or operation of any of the CSE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. Program component instances and controllers working in concert may do so through standard data processing communication techniques.

The configuration of the CSE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method comprising:

receiving at a call center a service call from a caller;

providing the caller with automated instructions on how the caller may indicate a level of satisfaction with a customer service representative and transfer to a new customer service representative on a device from which the service call is being made;

assigning a first customer service representative to the service call;

in a course of conversation between the first customer service representative and the caller, determining whether an indication, provided to the caller in the automated instructions, has been received from the caller to transfer the service call to a second customer service representative;

responsive to the determination that the indication has been received from the caller to transfer the service call to the second customer service representative, determining whether an indexing variable indicating the number of times the caller has switched customer service representatives exceeds a threshold value;

upon determining that the indexing variable does not exceed the threshold value, performing a first action comprising initiating transfer of the caller to the second customer service representative; and upon determining that the indexing variable exceeds the threshold value, performing a second action different from the first action.

2. The method of claim 1, wherein:

the caller is provided with the automated instructions on how the caller may indicate the level of satisfaction with the customer service representative and transfer to the new customer service representative; and the automated instructions include indicating the level of satisfaction by selecting a first key on the device and a desire to transfer to the new customer service representative by selecting a second key on the device.

3. The method of claim 2, wherein the automated instructions further include directing the caller to indicate the level of satisfaction by pressing the first key a certain amount of times within a predetermined time period.

4. The method of claim 1, wherein determining whether the indication has been received from the caller to transfer the service call to the second customer service representative includes determining whether the caller has pressed a predetermined key on the device indicating that the new customer service representative is requested.

5. The method of claim 1, further comprising prior to directing the caller to the second customer service representative, presenting via an interactive voice response system an option to the caller to indicate satisfaction or dissatisfaction with the first customer service representative and instructions for the caller to indicate a reason for requesting to be transferred to the second customer service representative.

6. The method of claim 1, further comprising enabling the caller to monitor the progress of the call in real time and provide satisfaction ratings at various times during the call.

7. The method of claim 1, wherein:
the caller is provided with the automated instructions on how the caller may indicate the level of satisfaction with the customer service representative and transfer to the new customer service representative; and
the automated instructions include indicating the level of satisfaction by pressing a sequence of keys on the device and a desire to transfer to the new customer service representative by pressing a specific key on the device.

8. The method of claim 1, wherein the second action comprises associating a negative rating with a profile of the caller and directing the caller to a supervising representative.

9. The method of claim 1, further comprising:
receiving, from the caller, satisfaction ratings for the first and second customer service representatives; and
recording a time associated with the satisfaction ratings.

10. The method of claim 9, wherein the ratings comprise numerical values.

11. The method of claim 9, wherein the ratings are received as an input to a web interface.

12. The method of claim 1, further comprising:
receiving, from the caller during the call, satisfaction ratings for at least one of the first or second customer service representative; and
prompting the caller to enter additional satisfaction data at the end of the call.

13. The method of claim 1, further comprising adjusting satisfaction ratings for the second customer service representative by transferring positive ratings from the first customer service representative to the second customer service representative if the second customer service representative resolves an issue that the first customer service representative could not resolve.

14. An apparatus comprising:
a processor; and
a memory in communication with the processor and containing program instructions for causing the processor to:
receive a service call from a caller;
provide the caller with automated instructions on how the caller may indicate a level of satisfaction with a customer service representative and transfer to a new customer service representative on a device from which the service call is being made;
assign a first customer service representative to the service call;
in a course of conversation between the first customer service representative and the caller, determine whether an indication, provided to the caller in the automated instructions, has been received from the caller to transfer the service call to a second customer service representative;
responsive to the determination that the indication has been received from the caller to transfer the service call to the second customer service representative, determine whether an indexing variable indicating the number of times the caller has switched customer service representatives exceeds a threshold value;
upon determining that the indexing variable does not exceed the threshold value, perform a first action comprising initiating transfer of the caller to the second customer service representative; and
upon determining that the indexing variable exceeds the threshold value perform a second action different from the first action.

15. The apparatus of claim 14, wherein:
the caller is provided with the automated instructions on how the caller may indicate the level of satisfaction with the customer service representative and transfer to the new customer service representative; and
the automated instructions include indicating the level of satisfaction by selecting a first key on the device and a desire to transfer to the new customer service representative by selecting a second key on the device.

16. The apparatus of claim 15, wherein the instructions further include directing the caller to indicate the level of satisfaction by pressing the first key within a predetermined time period.

17. The apparatus of claim 14, wherein to determine whether the indication has been received from the caller to transfer the service call to the second customer service representative, the memory further contains program instructions for causing the processor to determine whether the caller has pressed a predetermined key on the device indicating that the new customer service representative is requested.

18. The apparatus of claim 14, wherein the memory further contains program instructions for causing the processor to, prior to directing the caller to the second customer service representative, present via an interactive voice response system an option to the caller to indicate satisfaction or dissatisfaction with the first customer service representative and instructions for the caller to indicate a reason for requesting to be transferred to the second customer service representative.

19. The apparatus of claim 14, wherein the memory further contains program instructions for causing the processor to enable the caller to monitor the progress of the call in real time and provide satisfaction ratings at various times during the call.

20. The apparatus of claim 14, wherein:
the caller is provided with the automated instructions on how the caller may indicate the level of satisfaction with the customer service representative and transfer to the new customer service representative; and
the automated instructions include indicating the level of satisfaction by pressing a sequence of keys on the device and a desire to transfer to the new customer service representative by pressing a specific key on the device.

21. The apparatus of claim 14, wherein the second action comprises associating a negative rating with a profile of the caller and directing the caller to a supervising representative upon determining that the indexing variable exceeds the threshold value.

22. The apparatus of claim 14, wherein the memory further contains program instructions for causing the processor to:
receive, from the caller, satisfaction ratings for the first and second customer service representatives; and
record a time associated with the satisfaction ratings.

23. The apparatus of claim 22, wherein the ratings comprise numerical values.

24. The apparatus of claim 22, wherein the ratings are received as an input to a web interface.

25. The apparatus of claim 14, wherein the memory further contains program instructions for causing the processor to:
- receive, from the caller during the call, satisfaction ratings for at least one of the first or second customer service representative; and
- prompt the caller to enter additional satisfaction data at the end of the call.

26. The apparatus of claim 14, wherein the memory further contains program instructions for causing the processor to adjust satisfaction ratings for the second customer service representative by transferring positive ratings from the first customer service representative to the second customer service representative if the second customer service representative resolves an issue that the first customer service representative could not resolve.

* * * * *